Aug. 20, 1957  H. C. FRERKING  2,803,084
LIVE BOX
Filed April 17, 1956  2 Sheets-Sheet 2
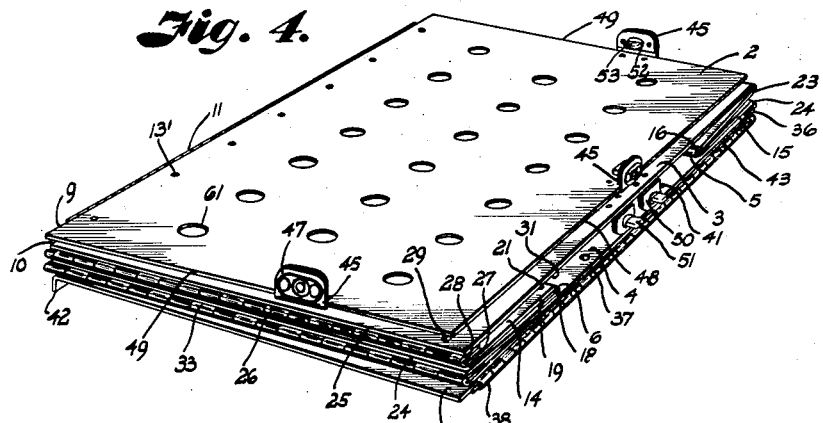
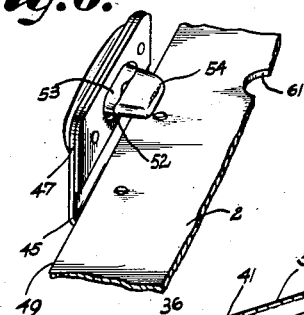
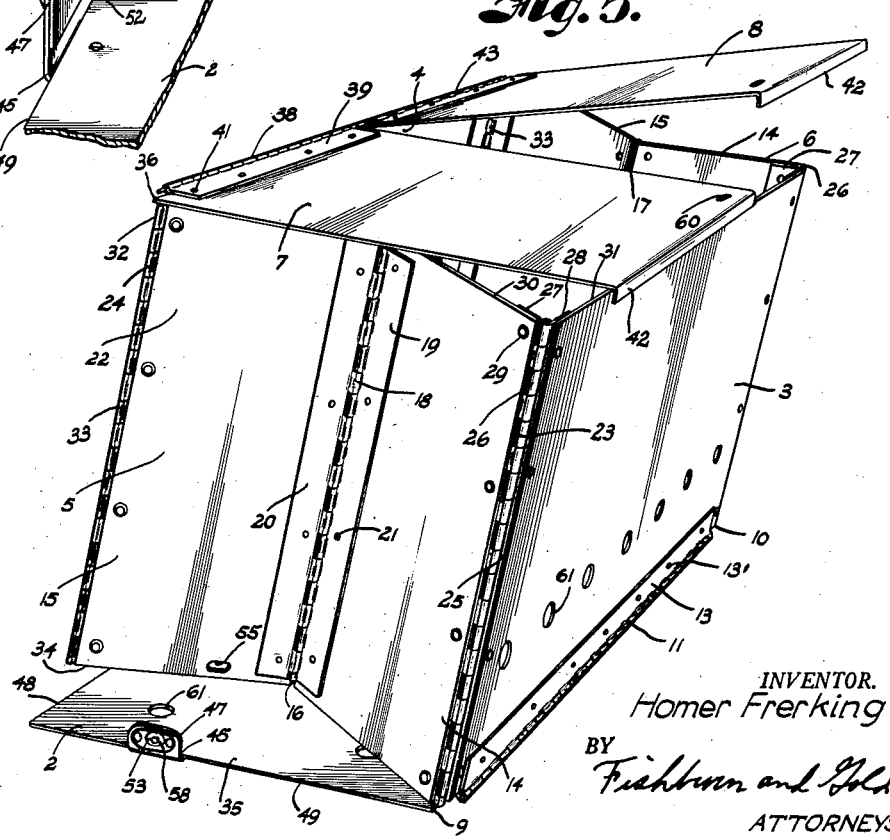
INVENTOR.
Homer Frerking
BY
ATTORNEYS.

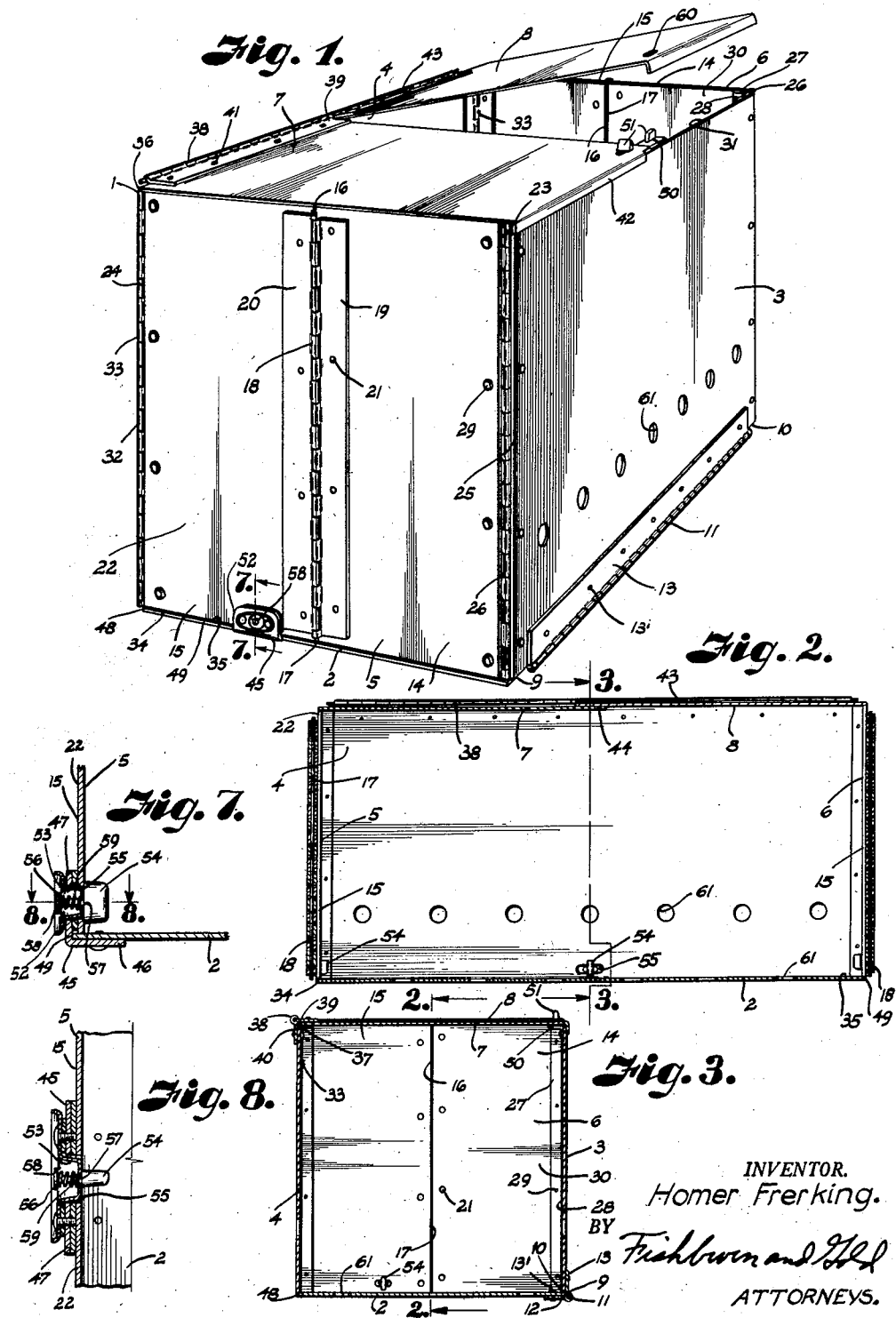

2,803,084
LIVE BOX

Homer C. Frerking, Kansas City, Mo.

Application April 17, 1956, Serial No. 578,649

1 Claim. (Cl. 43—55)

This invention relates to live boxes, and more particularly to such boxes for containing fish after they are caught for keeping such fish alive and which is readily collapsed and folded into a compact flat condition when not in use and is readily opened and set up in working condition for use.

The principal objects of the present invention are to provide a novel live box in which all the parts are in a unitary assembly capable of being collapsed to a relatively small flat shape for convenience of transportation; to provide a live box having substantially rigid wall portions of sheet metal or the like wherein one side wall is hinged to a bottom member and the end walls are each formed of two hinged portions one of which is hinged to one side wall and the other to the other side wall; to provide such a live box with relatively long hinge members to stiffen the structure; to provide such a live box with walls having cooperating engagement and locks spaced from the hinges and operative to hold the walls stably in set-up working position; to provide such a live box with a plurality of adjacent lid or cover members for facilitating insertion and removal of fish in the box without escape of others therein; and to provide a live box of this character that is sturdy, durable, easy to operate and economical to manufacture.

In accomplishing these and other objects of the present invention, I have provided improved details of structure, the preferred form of which is illustrated in the accompanying drawings, wherein:

Fig. 1 is a perspective view of a live box embodying the features of the present invention in set-up position.

Fig. 2 is a vertical longitudinal sectional view through the live box on the line 2—2, Fig. 3.

Fig. 3 is a transverse sectional view through the live box on the line 3—3, Fig. 2.

Fig. 4 is a perspective view of the live box in collapsed position.

Fig. 5 is a perspective view of the live box in partially erected position.

Fig. 6 is an enlarged detail perspective view of one portion of the wall locks.

Fig. 7 is an enlarged vertical sectional view through adjacent walls and the wall lock therefor taken on the line 7—7, Fig. 1.

Fig. 8 is a horizontal sectional view through the wall lock on the line 8—8, Fig. 7.

Referring more in detail to the drawings:

1 designates a live box wherein the parts are preferably formed of metal that is non-corrosive or treated to be substantially non-corrosive, and wherein the walls of the box are formed from sheets of such metal. The live box 1 includes a bottom wall 2, side walls 3 and 4, end walls 5 and 6 and cover or lid members 7 and 8, with each of said walls suitably hingedly connected to another adjacent wall whereby said walls form a unitary assembly.

The bottom wall 2 is preferably substantially rectangular in shape with a side edge portion 9 hingedly connected to the lower edge portion 10 of the side wall 3 by a hinge member 11. The hinge 11 is preferably relatively long whereby it extends substantially the full length of the edge portions 9 and 10 with plates 12 and 13 suitably secured as by rivets, welding or the like 13' to the margin of bottom wall 2 adjacent the edge 9 and the margin of the side wall 3 adjacent the edge 10 respectively, the hinge 11 preferably being such that the side wall 3 swings outwardly from upright position relative to the bottom wall as the box is being collapsed and the edge 10 of the side wall 3 rests on the bottom wall when the box is erected.

The end walls 5 and 6 each include sections 14 and 15 adapted to be positioned in the same plane with their adjacent edges 16 and 17 swingably connected by a hinge 18, said hinge preferably being elongate whereby it extends substantially the length of the edges 16 and 17 with plates 19 and 20 suitably secured as by rivets, welding or the like 21 to the outer surfaces 22 of the sections 14 and 15 respectively. The edges 23 and 24 of the end wall sections 14 and 15 and opposite the edges 16 and 17 respectively are parallel with the axis of the hinge 18 and are positioned adjacent the end edges of the side walls 3 and 4 respectively, the end walls 5 and 6 being substantially the same in structure whereby in erected position the hinge 18 is substantially perpendicular to the bottom wall 2 and is midway between the edges 23 and 24. The edges 23 of the end wall section 14 are each swingably connected to the end edges 25 of the side wall 3 by means of hinges 26. The hinges 26 preferably are elongate and extend substantially the length of the edges 23 and 25 and have plates 27 and 28 suitably secured by rivets, welding or the like 29 to the inner surfaces 30 and 31 of the end wall sections 14 and side wall 3 respectively. The end wall sections 15 are hingedly connected to the end edges 32 of the side wall 4 by hinges 33 substantially in the same manner as the hinges 26 are connected to the end wall sections 14 and side wall 3. The end wall sections are preferably positioned whereby the bottom edges 34 thereof rest on the upper surface 35 of the bottom wall 2 when the box is in set-up position.

While a single lid or cover may be used, it is preferable to use a plurality of same whereby a portion of the box may be opened for insertion or removal of fish without escape of other fish from the interior of the box. The lid or cover member 7 is preferably positioned on the portion of the box toward the end wall 5 and the cover member 8 positioned on the box toward the end wall 6 whereby the end edge portions of the cover members 7 and 8 will overlie the upper edges of the end walls 5 and 6 when in erected position. The cover member 7 has an edge 36 swingably connected to the upper edge 37 of the side wall 4 by means of an elongate hinge 38 having a plate portion 39 and 40 suitably secured as by rivets or welding 41 to the outer surface of the cover 7 and side wall 4. The opposite edge portion of the cover member 7 overlies the upper edge of the side wall 3 and is provided with a depending flange 42 which when in closed position extends downwardly substantially engaging the outer surface of the side wall 3. The cover member 8 is substantially of the same construction as the cover member 7 and is swingably connected by a hinge 43 to the upper edge 37 of the side wall 4 and said cover members are preferably of such size that the adjacent edge portions will overlap as at 44.

Suitable fastening devices are arranged on the walls for inter-engagement when in erected or set-up position to retain the walls in said set-up position. In the illustrated structure, the lock members are conventional luggage latches or the like. The bottom wall 2 is provided with three angle members 45 with one leg 46 of each under the bottom member 2 and suitably secured thereto and the other leg 47 extending upwardly adjacent the respective edge of said bottom member. One of the angles 45 is mounted at the edge 48 opposite the edge 9 of said bottom wall and preferably substantially midway the length of said edge 48. The other two angle members 45 are adjacent the end edges 49 of said bottom wall and substantially closer to the edge 48 than the edge 9. A similar angle member 50 is suitably secured adjacent the upper edge of the side wall 3 to mount locks 51 for the covers 7 and 8. Each of the angle members 45 are provided with lock members 52 of conventional structure having a base member 53 from which a lug 54 extends. The lug 54 is preferably of a thickness less than the width and of suitable size to extend through an elongated slot 55 in the respective wall to be secured thereby. Each of the lugs 54 are carried on a shaft 56 which extends through an opening 57 in the base member 53 and terminates in a head 58, a spring 59 being sleeved on the shank between the head 58 and the base 53 to urge the lug against adjacent portion of the base member.

The end wall sections 15 and the side wall 4 each have elongated slots 55 adjacent their lower edges and positioned for aligning with the lock lugs 54 when in set-up position whereby said lugs will extend through said slots and then the lugs being rotated through 90 degrees will extend transversely of the slots and retain the walls in set-up position relative to the bottom member. The lock members 51 are of the same construction and the lugs thereon are adapted to extend through elongated slots 60 in the cover members.

It is preferable that selected walls have apertures 61 therein for circulation of water through the box when the box is immersed. In the illustrated structure, a plurality of such apertures 61 are arranged in the bottom wall 2 and side walls 3 and 4, however, additional apertures may be arranged in the side walls and end walls as desired, the apertures being of suitable size for circulation of water but relatively small relative to fish or the like to be contained in the box whereby fish cannot escape through the apertures.

In setting up a box constructed and assembled as described, and assuming the box is in collapsed position as illustrated in Fig. 4, the bottom wall 2 is swung from overlying position relative to the side wall 3, then the structure inverted whereby the locks extend upwardly from the bottom wall. The other portions of the box are swung upwardly on the hinge 11 and the end wall sections 14 and 15 swung outwardly from the interior of the side walls 3 and 4 respectively on the hinges 26 and 33 and the covers swung upwardly from the overlying position relative to the side wall 4 substantially to position shown in Fig. 5. The bottom edges of the end walls and side wall 4 are then positioned on the upper surface of the bottom wall 2 and the side walls forced outwardly until the lugs 54 extend through the slots 55 in the end wall sections 15 and side wall 4. Then the lugs 54 are turned to retain the side walls in set-up position. The box is then ready for use.

In collapsing the box, the lugs are turned to release the inter-engagement of the locks and walls, the end walls are folded inwardly and the various walls collapsed in reverse order to that described in setting up the box until the walls are substantially flat as illustrated in Fig. 4.

It is to be understood that while I have illustrated and described one form of my invention, it is not to be limited to the specific form or arrangement of parts herein described and shown except insofar as such limitations are included in the claim.

What I claim and desire to secure by Letters Patent is:

A collapsible live box comprising, a substantially rectangular bottom wall, a side wall, hinge means connecting adjacent edges of the bottom wall and side wall for swingably connecting said side wall to the bottom wall, a second side wall, end walls each having hingedly connected sections whereby said end walls are foldable substantially on a line midway between opposite side edges, hinge means connecting one of said opposite edges of the end walls and adjacent edges of said first-named side wall for swinging movement of the adjacent end wall section to overlie the inside of said first-named side wall, hinge means connecting the other of the opposite side edges of the end walls and the adjacent edges of the second side walls for swinging movement of the adjacent end wall section to overlie the inside of said second side wall, a plurality of adjacent top walls each having one edge hingedly connected to one of the side walls and the opposite edge thereto overlying the upper edge of the other side wall when the box is in set-up position, opposite walls of said box having a plurality of spaced apertures therein, brackets fixed to the bottom wall remote from the first-named side wall and on the side edge of the bottom wall adjacent the second side wall when in erected position, said brackets having upstanding flanges at said end edges and at said side edge of the bottom wall, said second side wall and the end wall sections remote from the first-named side wall having apertures therein adjacent the brackets, and lock means on the bracket flanges and including pivotally mounted lugs aligned with the apertures in said second side wall and end wall sections and adapted to extend therethrough and engage the respective walls to retain same between said lugs and the respective bracket flanges to hold the walls of the box in set-up position, and cooperative interengaging lock means on said top wall and the side wall adjacent said opposite edges of the top walls for retaining the top walls in box closing position.

References Cited in the file of this patent

UNITED STATES PATENTS

| 247,316 | Crane | Sept. 20, 1881 |
| 2,563,827 | Ertner | Aug. 14, 1951 |
| 2,664,221 | Seltzer | Dec. 29, 1953 |
| 2,720,998 | Potter | Oct. 18, 1955 |

FOREIGN PATENTS

| 14,586 | Great Britain | Nov. 4, 1884 |